United States Patent [19]
Rienzo, Sr.

[11] 3,990,148
[45] Nov. 9, 1976

[54] DEVICE FOR CUTTING A FISHING LINE

[75] Inventor: Donald D. Rienzo, Sr., Hicksville, N.Y.

[73] Assignee: Allan Tackle Manufacturing Co., Inc., Hicksville, N.Y.

[22] Filed: Aug. 13, 1975

[21] Appl. No.: 604,267

[52] U.S. Cl. .................................. 30/287; 30/290; 30/296 R
[51] Int. Cl.² ......................................... B26B 27/00
[58] Field of Search ............. 30/296 R, 296 A, 290, 30/287, 288, 299, DIG. 8

[56] References Cited
UNITED STATES PATENTS

| | | | |
|---|---|---|---|
| 268,012 | 11/1882 | Goodrich | 30/296 R |
| 691,289 | 1/1902 | McKim | 30/296 R |
| 945,384 | 1/1910 | Fogarty | 30/296 R |
| 966,931 | 8/1910 | Le Massena | 30/296 R |
| 1,338,248 | 4/1920 | Nelson | 30/290 X |
| 2,556,366 | 6/1951 | Miller | 30/299 X |
| 2,561,289 | 7/1951 | Paris | 30/296 R |

Primary Examiner—Al Lawrence Smith
Assistant Examiner—J. T. Zatarga
Attorney, Agent, or Firm—Hane, Sullivan & Spiecens

[57] ABSTRACT

There is disclosed a device for cutting a fishing line by pulling the same sharply against cutting edges on the device. The device also provides a flap including an opening for hooking a fish hook tied to the line thereby preventing flapping of the line when the rod is not in use.

2 Claims, 5 Drawing Figures

DEVICE FOR CUTTING A FISHING LINE

The present invention relates to a device for cutting a fishing line, and more particularly to a line cutter attachable to a fishing rod.

BACKGROUND

When fishing with a rod, line cutting of the line — for instance to change the hook or to tie a fly or a sinker to the line — is a rather frequent occurrence. The heretofore usual practice is to cut the line with a sharp knife, but this is rather inconvenient as the fisherman must hold the rod, the end of the line to be cut and manipulate the knife. Moreover, injuries are caused not infrequently by piercing the skin of the hand of the fisherman when he pulls the line taut to cut the line at the desired point.

THE INVENTION

It is a broad object of the invention to provide a novel and improved line cutter attachable to the fishing rod, preferably between the reel and the next adjacent line guide and which has a cutting edge or cutting edges for cutting the line at any desired point by pulling the line sharply against the cutting edge or edges.

A more specific object of the invention is to provide a line cutter of the general type above referred to which has a flat portion for attaching the line cutter to the rod in the same manner as a line guide is generally secured to the rod, namely by tightly wrapping thread about the flat portion and the rod.

Another more specific object of the invention is to provide a novel and improved line guide of the type above referred to which has a flat and pointed tongue for attaching the line cutter to the rod by pushing the tongue between the rod and wrapped threads securing a line guide to the rod.

Still another object of the invention is to provide a line cutter of the type above referred to which has an upwardly protruding flap including an opening for hooking the hook on the line to said flap thereby holding in taut position along the rod, thus preventing entanglement of the line and hook with clothing and other objects as tends to occur when the line is not properly secured in some fashion.

SUMMARY OF THE INVENTION

The aforepointed out objects, features and advantages, and other objects, features and advantages which will be pointed out hereinafter are obtained by providing an elongate plate made of steel or other hard metal and having at one end a lengthwise cut or slit defining an elongate strip at that end of the plate. The strip is bent up at an acute angle with the plate. The inner edge of the strip in conjunction with adjacent edge on the plate constitute cutting edges for cutting a fishing line in a scissor or shear-like fashion by pulling the line against the edges at the converging ends thereof.

According to a further aspect of the invention, the plate has at its slitted end an upwardly bent flap including a hole for hooking therein a fish hook tied to the line thereby securing the line against swinging loose by pulling it taut by appropriately setting the reel, thus avoiding entanglement of the line.

The opposite of the plate is preferably tongue-shaped so that it can be secured to the rod by slipping it between threads wrapped about the rod.

BRIEF DESCRIPTION OF THE DRAWING

In the accompanying drawing, a preferred embodiment of the invention is shown by way of illustration and not by way of limitation.

In the drawing.

DETAILED DESCRIPTION OF THE DRAWING

Figure 1:
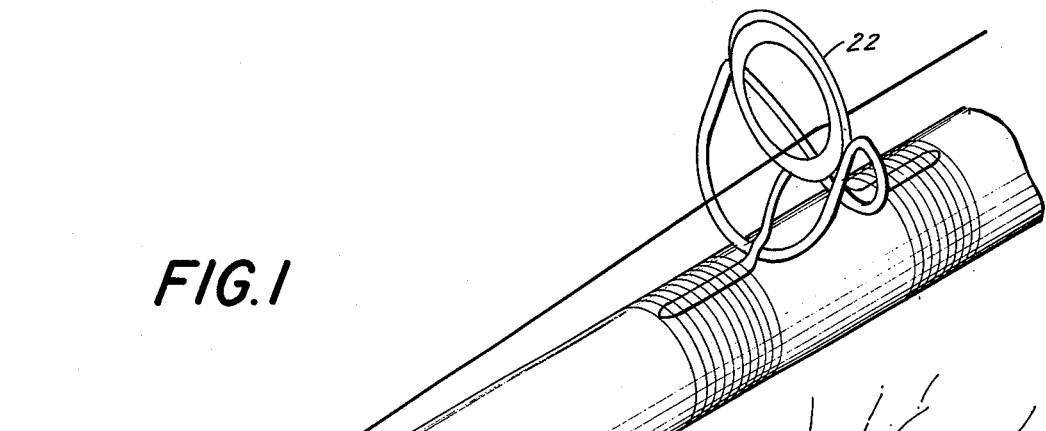
FIG. 1 is a perspective view of a line cutting device according to the invention secured to a fishing rod.

Referring now to the figures in greater detail, and first to FIG. 1, this figure shows a line cutting device 1 secured to a fishing rod 2. The figure shows the cutting device approximately at its suitable size, but of course the cutting devices can also be made larger or smaller.

The device is made of a suitable hard material such as a strip of steel 5. At one end this strip is slit to form a tongue 6 which is upwardly bent to define an acute angle with the plane of strip 5, as is clearly shown in FIGS. 2 and 3. The bent-up tongue 6 and the flat strip 5 define between the adjacent edges a tight apex at the converging point of the edges. As a result, the tongue in conjunction with the strip will produce a shear or scissor-like cutting action if and when it is desired to cut a fishing line.

As it is shown in FIGS. 2 to 5, the cutting of a line is effected by placing a fishing line 10 to be cut between the edges of strip 5 and tongue 6. If now a sharp pull is applied to the line the line will be cut by scissor or shear action at the converging point of strip 5 and tongue 6.

The end of the cutting device which is slit to form tongue 6 is further provided with an upwardly turned flap 12 which is preferably integral with the main body of the cutting device and includes a hole 12a.

The other end of the cutting device is preferably shaped as a tongue 15.

The entire cutting device is preferably manufactured by stamping out a suitably shaped blank the respective end of which is then slit to form tongue 6 and the flap 12 including its hole 12a. Manufacture is then completed by bending up tongue 6 and flap 12.

The cutting device, in addition to the afore-described cutting function, serves a second function—namely, to secure the fishing line with a hook thereon in position when not in use. As it is shown in FIG. 1, the line 10 having attached thereto hook 20 is held in position by hooking the hook into flap opening 12a. The reel can then be so set that the line is reasonably taut.

As it is well known to fishermen, the fishing line when not in use has a tendency to flap and swing when the fishing rod is carried, and as a result the hook may be entangled and not infrequently is entangled in clothing or worse can lead to injuries by piercing the skin of the fisherman or others nearby.

Figure 2:
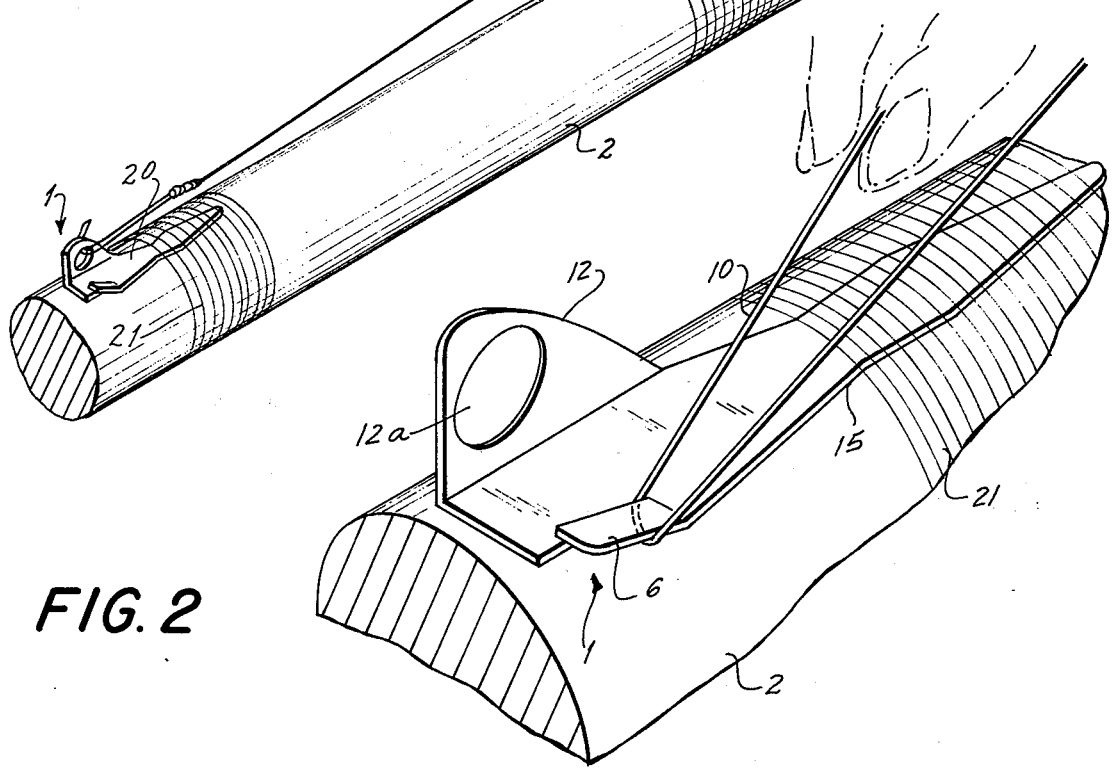
FIG. 2 is a fragmentary perspective view of the rod cutter on an enlarged scale and being used for cutting a line.
Figure 3:
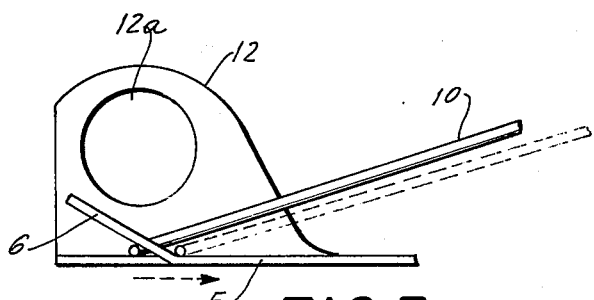
FIG. 3 is a fragmentary elevational view showing a fishing line applied to the cutting device for cutting a line.
Figure 5:
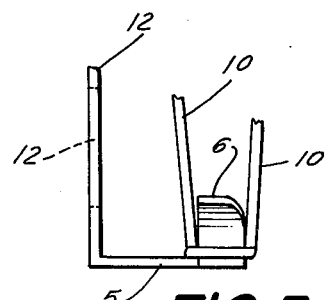
FIG. 5 is a side view of FIG. 3.
Figure 4:
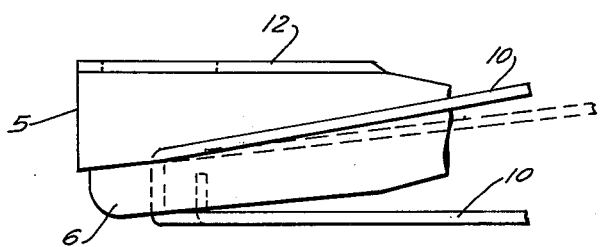
FIG. 4 is a plan view of FIG. 3.

Attachment of the cutting device can be conveniently effected by wrapping threads of the type used for securing line guides to the rod. Fastening of the cutting device by threads 21 is shown in FIGS. 1 and 2. The tongue-shaped end 15 of the cutting device also makes it possible to push the tongue between the rod and threads used for attaching a line guide 22 in a conventional manner and to a fishing rod.

FIG. 1 shows the line guided to line guide 22 and mounting in alignment with the guide, but of course it is also possible and within the concept of the invention to secure the cutting device so that the fishing line can be secured in position without passing through line guides. Various other means for securing the line cutter to the fishing rod can, of course, also be used.

While the invention has been described in detail with respect to a certain now preferred embodiment and example of the invention, it will be understood by those skilled in the art, after understanding the invention, the various changes and modifications may be made without departing from the spirit and scope of the invention, and it is intended therefore, to cover all such changes and modifications in the appended claims.

What is claimed is:

1. A device for cutting a fishing line, said line cutting device comprising a flat elongate plate of hard metal for attachment to a fishing rod, said plate having at one end portion a lengthwise slot defining an elongate strip of a width less than the width of the plate, said strip being upwardly bent out of the material of the plate defining an arcuate angle relative thereto, the inner edge of said strip in conjunction with the adjacent edge of the plate constituting cutting edges for cutting a fishing line upon pulling the same against said edges; and a flap extending on said one end portion of the plate upwardly in the same direction as said strip and including an opening therethrough for releasably hooking therein a fish hook attached to a fishing line, said flap being integral with the plate and extending lengthwise of the plate and substantially normal thereto.

2. The line cutting device according to claim 1 wherein the opposite end portion of the plate is tapered toward its tip for slipping said tapered portion between a fishing rod and threads tightly wrapped thereabout thereby securing the line cutting device to the rod.

* * * * *